United States Patent
Wu et al.

[11] Patent Number: 6,114,090
[45] Date of Patent: Sep. 5, 2000

[54] THERMALLY-STABLE PHOTOPOLYMER COMPOSITION AND LIGHT TRANSMISSIVE DEVICE

[75] Inventors: Chengjiu Wu, Morristown; Michael J. McFarland, Washington; Karl W. Beeson, Princeton, all of N.J.

[73] Assignee: Corning Incorporated, Corning, N.Y.

[21] Appl. No.: 08/324,855

[22] Filed: Oct. 18, 1994

Related U.S. Application Data

[63] Continuation of application No. 08/086,219, Jul. 1, 1993, abandoned.

[51] Int. Cl.$^7$ .................................................. G03C 1/725
[52] U.S. Cl. ...................................... 430/281.1; 430/288.1
[58] Field of Search .................................. 430/281, 288, 430/281.1, 288.1

[56] References Cited

U.S. PATENT DOCUMENTS

| | | | |
|---|---|---|---|
| 4,609,252 | 9/1986 | Wong et al. | 350/96.12 |
| 4,613,560 | 9/1986 | Wu et al. | 430/281 X |
| 4,623,676 | 11/1986 | Kistner | 430/288 X |
| 4,942,112 | 7/1990 | Monroe et al. | |
| 4,956,265 | 9/1990 | Klun et al. | 430/284 |
| 5,136,682 | 8/1992 | Moyer et al. | 385/141 |
| 5,288,589 | 2/1994 | McKeever et al. | 430/288 X |

FOREIGN PATENT DOCUMENTS

| | | |
|---|---|---|
| 4 126 75 | 2/1991 | European Pat. Off. . |
| 0 446 672 A1 | 9/1991 | European Pat. Off. . |
| 63 081 301 | 4/1992 | Japan . |

OTHER PUBLICATIONS

Polymers For Lightwave and Integrated Optics, Technology and Applications, Lawrence A. Hornak, pp. 145–169.

*Primary Examiner*—Mark Chapman

[57] ABSTRACT

A photopolymerizable composition for use in forming a photopolymer composition for use in forming the light transmissive regions of light transmissive devices, and such devices.

The photopolymerizable composition comprises one or more ethylenically unsaturated monomers selected from the group consisting of aryl acrylates and aryl methacrylates and preferably multi-functional aryl acrylates and aryl methacrylates such as aryl triacrylates, aryl diacrylates, and aryl tetraacrylates; and a photoinitiator that activates polymerization of the unsaturated monomers upon exposure to actinic radiation. The composition may be polymerized to form a photopolymer which on exposure to a temperature of 190° C. in air for 24 hours exhibits a coloration on the Gardner Color Scale equal to or less than 8 as determined by ASTM D1544-80 and which exhibits no cracking or delamination from a glass substrate as defined by ASTM D4538-90A on exposure of the same to a temperature of 190° C. for 24 hours in air.

17 Claims, 2 Drawing Sheets

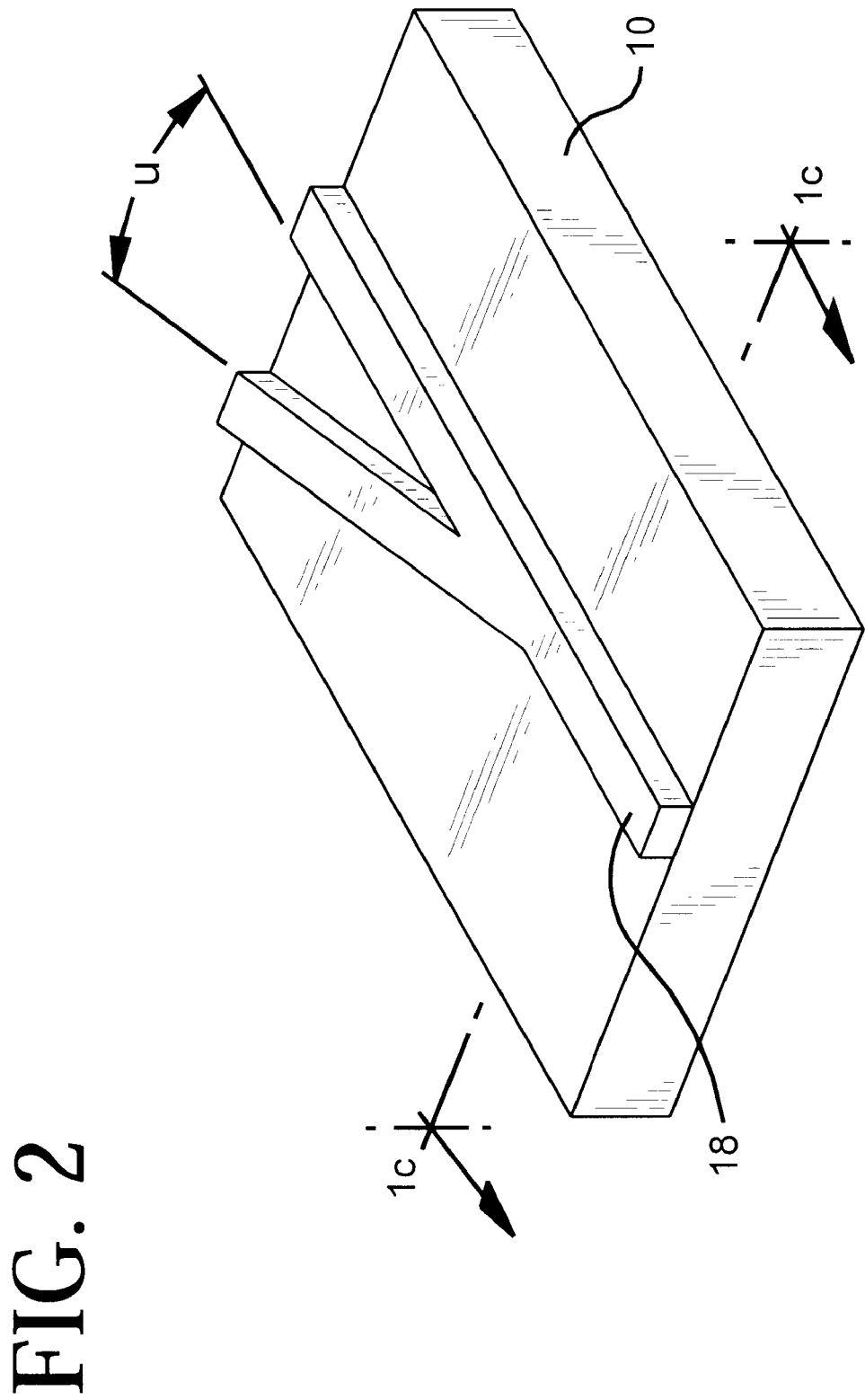

THERMALLY-STABLE PHOTOPOLYMER COMPOSITION AND LIGHT TRANSMISSIVE DEVICE

This application is a continuation of application Ser. No. 08/086,219 filed Jul. 1, 1993 now abandoned.

BACKGROUND OF THE INVENTION

1. Field of the Invention

This invention relates to photo-polymerizable compositions and to thermally stable photopolymer compositions prepared therefrom. Another aspect of the invention relates to light transmissive optical devices, such as waveguides formed from the photopolymer composition of this invention.

2. Prior Art

In optical communication systems, messages are transmitted by carrier waves of optical frequencies that are generated by light sources such as lasers or light-emitting diodes. There is much current interest in such optical communication systems because they offer several advantages over conventional communication systems, such as a greatly increased number of channels of communication and the ability to use other materials besides expensive copper cables for transmitting messages. One such means for conducting or guiding waves of optical frequencies from one point to another is called an "optical waveguide." The operation of an optical waveguide is based on the fact that when a medium which is transparent to light is surrounded or otherwise bounded by another medium having a lower refractive index, then light introduced along the inner medium's axis is highly reflected at the boundary with the surrounding medium, thus producing a guiding effect.

The most frequently used material for such a waveguide device is glass, which is formed into a fiber of specified dimension. However, optically-transparent polymers are increasingly being used as the light transmissive element. Conventional optically-transparent polymers suffer from one or more defects. For example, a common property of optically transparent polymers is that the polymers become discolored when heated for extended periods of time. The visual effect is that the polymers become yellow. The thermally-induced discoloration in polymers results from a number of factors as for example chemical reactions that slowly degrade the polymer. Longer heating times usually cause greater discoloration than shorter heating times. What initially might be a light yellow discoloration may eventually turn to brown or even black. If a sample of discolored polymer is examined in an absorption spectrophotometer, an absorption band tail can be observed that extends from the intrinsic ultraviolet absorption bands of the polymer into the visible spectral region (400 nm to 700 nm) and even into the infrared spectral region (>700 nm). The absorption tail typically has no discernable fine structure. The absorption of light in the region of transmission reduces the intensity of the optical wave as it passes through the waveguide, a phenonemon which contributes to "optical loss" or "optical power loss".

Multimode optical waveguides are used primarily in the infrared spectral region from 700 nm to 1300 nm. If a polymer optical waveguide is heated for an extended period of time and if a thermally-induced absorption band tail extends into this infrared wavelength region of operation, the transmission of light through the waveguide can be dramatically reduced. For cases of severe discoloration, the waveguide becomes useless.

Photopolymer films and waveguides can crack when heated to elevated temperatures. A crack in a waveguide scatters light and generally reduces the effectiveness of the waveguide. Such cracking is a result of stress. The stress can be internal to the waveguide, resulting from non-uniformities in the photopolymer composition, or stress can result from substrate or overcoat materials in contact with the waveguide which have different coefficients of thermal expansion than the waveguide material. Even the process of forming a photopolymer waveguide on a substrate by UV exposure of monomer precursors generally results in a waveguide that is under tensile stress. This occurs because the volume occupied by a photopolymer is usually smaller than the volume of the monomer precursors. The amount of shrinkage can be as much as 10%.

A third effect which results from changing the temperature is delamination of the waveguide from the substrate. Delamination changes the properties of the waveguide (e.g. the numerical aperture or NA) and weakens the waveguide structure so that it is more susceptible to damage from vibration and other environmental factors such as moisture.

SUMMARY OF THE INVENTION

One aspect of this invention relates to a photopolymerizable composition comprising:

one or more ethylenically unsaturated monomers selected from the group consisting of aryl acrylates and aryl methacrylates preferably multi-functional aryl acrylates and aryl methacrylates such as aryl triacrylates, aryl diacrylates and aryl tetra-acrylates; and a photoinitiator that activates polymerization of said unsaturated monomers upon exposure to actinic radiation, said composition can be polymerized to form a photopolymer which on exposure to a temperature of 190° C. in air for 24 hrs. exhibits a coloration on the Gardner Color Scale equal to or less than 8 as determined by ASTM D1544-80 and which exhibits no cracking or delamination from a glass substrate as defined by ASTM D 4538-90 A on exposure of same to a temperature of 190° C. for 24 hrs. in air.

Another aspect of this invention relates to a photopolymer formed by exposing the photopolymerizable composition of this invention to actinic radiation.

Yet another aspect of this invention relates to a light transmissive device, such as an optical waveguide, comprising a substrate having a predetermined pattern of light transmissive regions on the surface of the substrate, said device comprising a body comprising a light transmissive region comprising the photopolymer of this invention.

This invention provides for one or more advantages over polymers presently used in the fabrication of light transmissive devices. For example, the photopolymer of this invention exhibits enhanced thermal stability which provides for reduced discoloration after treatment or use at relatively high temperatures (i.e. from about −50° C. to about 125° C.), which in turn, results in higher light transmissive properties than those exhibited by less thermally stable polymers. These properties are particularly advantageous when the photopolymer is used in the fabrication of the light transmissive element of a light transmissive device such as a waveguide which is exposed to relatively high temperatures during fabrication. Preferred photopolymers of this invention also are resistant to delamination when bonded to a substrate and cracking, which are also desirable properties for polymers used in the fabrication of the light transmissive elements of light transmissive devices.

BRIEF DESCRIPTION OF THE DRAWINGS

In the drawings:

FIG. 2 illustrates, in schematic and isometric cross-section, the configuration of a preferred waveguide of this invention.

DESCRIPTION OF THE PREFERRED EMBODIMENTS

Figure 1A:
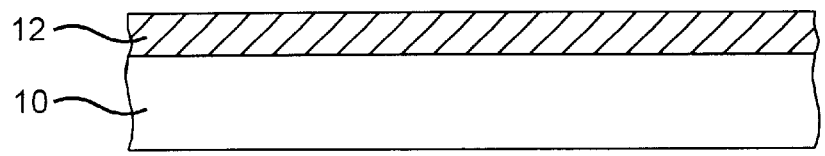
FIGS. 1(a) to 1(c) illustrate in schematic cross-section, several of the major steps in the process of forming a preferred waveguide of this invention.

The photopolymerizable composition of this invention comprises two essential ingredients. The first essential ingredient is a photopolymerizable ethylenically unsaturated monomer selected from the group consisting of aryl acrylates and aryl methacrylates ("aryl acrylate monomers"). Illustrative of such aryl acrylate monomers are aryl diacrylates, triacrylates and tetra acrylates as for example di, tri and tetraacrylates based on benzene, naphthalene, bisphenol-A, biphenylene, methane biphenylene, trifluoromethane biphenylene, phenoxyphenylene and the like. The preferred aryl acrylate monomers are multifunctional aryl acrylates and methacrylates and more preferred aryl acrylate monomers are di, tri and tetra acrylates and methacrylates based on the bisphenol-A structure. Most preferred aryl acrylate monomers are alkoxylated bisphenol-A diacrylates and dimethacrylates such as ethoxylated bisphenol-A di-acrylate and dimethacrylates, propoxylated bisphenol A diacrylates and dimethacrylates and ethoxylated hexafluorobisphenol-A diacrylates and dimethacrylates. The aryl acrylate monomers of choice are ethoxylated bisphenol-A diacrylate and dimethacrylates.

The amount of aryl acrylate monomer in the composition may vary widely and amounts normally used in photopolymerizable compositions for use in the preparation of photopolymers for use as the light transmissive element of light transmissive devices may be used. The amount of aryl acrylate monomer is usually from about 35 to about 99.9% by weight of the composition, preferably from about 60 to about 98% by weight of the composition and more preferably from about 65 to about 95% by weight of the composition.

As another essential component, the polymerizable composition of this invention includes a photoinitiator system which is activated by actinic radiation to produce activated species which lead to photo polymerization of the aryl acrylate monomer. The photoinitiator system will contain a photoinitiator and preferably a conventional sensitizer which extends the spectral response into regions having spectral utility, e.g. the near U.V. region and the visible spectral regions where lasers excite. Usually the photoinitiator is a free radical-generating addition polymerization initiator activated by actinic light and is preferably thermally inactive at and below room temperature (e.g. about 20° C. to about 25° C.) Illustrative of such initiators are those described in U.S. Pat. No. 4,942,112 and references cited therein. Preferred free radical initiators are 1-hydroxy-cyclohexyl-phenyl ketone (Irgacure184), benzoin, benzoin ethyl ether, benzoin isopropyl ether, benzophenone, benzidimethyl ketal (Irgacure 651), α,α-diethyloxy acetophenone, α,α-dimethyloxy-α-hydroxy acetophenone (Darocur 1173), 1-[4-(2-hydroxyethoxy)phenyl]-2-hydroxy-2-methyl-propan-1-one (Darocur 2959), 2-methyl-1-[4-methylthio)phenyl]-2-morpholino-propan-1-one (Irgacure 907), 2-benzyl-2-dimethylamino-1-(4-morpholinophenyl)-butan-1-one (Irgacure 369), poly{1-[4-(1-methylvinyl) phenyl]-2-hydroxy-2-methyl-propan-1-one} (Esacure KIP), [4-(4-methylphenylthio)-phenyl]phenylmethanone (Quantacure BMS), di-campherquinone. The more preferred photoinitiators includes benzidimethyl ketal (Irgacure 651), α,α-diethyloxy acetophenone, α,α-dimethyloxy-α-hydroxy acetophenone (Darocur 1173), 1-hydroxy-cyclohexyl-phenyl ketone (Irgacure 184), 1-[4-(2-hydroxyethoxy) phenyl]-2-hydroxy-2-methyl-propan-1-one (Darocur 2959), 2-methyl-1-4-(methylthio)phenyl]-2-morpholino-propan-1-one (Irgacure 907), 2-benzyl-2-dimethylamino-1-(4-morpholinophenyl)butan-1-one (Irgacure 369). The most preferred photoinitiators are those which tend not to yellow upon irradiation and, thus, do not increase the coloration of the composition on the Gardner scale to a value of greater than 8 points on exposure to a temperature of 190° C. for 24 hrs. as determined by ASTM D1544-80. Such photoinitiators include benzidimethyl ketal (Irgacure 651), α,α-dimethyloxy-α-hydroxy acetophenone (Darocur 1173), 1-hydroxy-cyclohexyl-phenyl ketone (Irgacure-1 84), and 1-[4-(2-hydroxyethoxy)phenyl]-2-hydroxy-2-methyl-propan-1-one (Darocur 2959).

The amount of photoinitiator may vary widely and conventional amounts may be used. Usually, the amount of photoinitiator is from about 0.1 to about 10 by weight of the composition. The amount of photoinitiator is preferably from about 0.5 to about 10% by weight, and more preferably from about 0.5 to about 5% by weight based on the total weight of the composition.

In addition to the essential ingredients, the composition of this invention may include various optional ingredients which are typically used in photopolymerizable compositions used to form photopolymers for use as the light transmissive element of light transmissive devices. Such optional ingredients are well known in the art and include stabilizers, inhibitors, plasticizers, optical brightners, release agents, chain transfer agents, other photopolymerizable monomers and the like.

The composition of this invention preferably includes one or more other photopolymerizable monomeric components besides the essential aryl acrylate monomer. The other monomeric components can be used for many purposes as for example to fine tune the properties of the composition such as to fine tune crosslinking density, viscosity, adhesion, curing rate, refractive index and the like without unduly endangering the basic properties provided by the aryl acrylate monomer e.g. reduced discoloration, cracking and delamination properties of the photopolymer formed from the composition. Other monomers include photopolymerizable aliphatic ethylenically unsaturated monomers, preferably acrylate or methacrylate monomers and more preferably multifunctional acrylate or methacrylate monomers. Illustrative of useful minor monomeric components are those selected from the group consisting of butyl acrylate (BA), ethylhexyl acrylate (EHA), phenoxyethyl acrylate (PEA), β-carboxylethyl acrylate (β-CEA), isobornyl acrylate (IBOA), tetrahydrofurfuryl acrylate (THFFA), cyclohexyl acrylate (CHA), propylene glycol monoacrylate (MPPGA), 2-(2-ethoxyethoxy) ethyl acrylate (EOEOEA), N-vinyl pyrrolidone (NVP),1,6-hexanediol diacrylate (HDDA) or dimethacrylate (HDDMA), neopentyl glycol diacrylate (NPGDA), diethylene glycol diacrylate (DEGDA) or dimethacrylate (PEGDMA), triethylene glycol diacrylate (TEGDA) or dimethacrylate (TEGDMA), tetraethylene glycol diacrylate (TTEGDA) or dimethacrylate (TTEGDMA), polyethylene glycol diacrylate (PEGDA) or dimethacrylate (PEGDMA), dipropylene glycol diacrylate (DPGDA), tripropylene glycol diacrylate (TPGDA), ethoxylated neopentyl glycol diacrylate (NPEOGDA), propoxylated neopentyl glycol diacrylate (NPPOGDA), aliphatic diacrylate (ADA), alkoxylated aliphatic diacrylate (AADA), aliphatic carbonate diacrylate (ACDA), trimethylolpropane triacrylate (TMPTA) or trimethacrylate (TMPTMA), pentaerythritol triacrylate (PETA), ethoxylated trimethylolpropane triacrylate (TMPEOTA), propoxylated trimethylolpropane triacrylate (TMPPOTA), glyceryl propoxylated triacrylate (GPTA), tris (2-hydroxyethyl) isocyanurate triacrylate (THEICTA), pentaerythritol tetraacrylate (PETTA), dipentaerythritol pentaacrylate (DPEPA), ditrimethylolpropane tetraacrylate (DTMPTTA), alkoxylated tetraacrylate (ATTA). The most preferred monomers for minor components includes trimethylolpropane triacrylate (TMPTA), 1,6-hexanediol diacrylate (HDDA), pentaerythritol triacrylate (PETA), ethoxylated trimethylolpropane triacrylate (TMPEOTA), glyceryl propoxylated triacrylate (GPTA), pentaerythritol tetraacrylate (PETTA), dipentaerythritol pentaacrylate (DPEPA), ditrimethylolpropane tetraacrylate (DTMPTTA).

The total amount of other monomer components in the composition may vary widely and is usually from about 0 to 65% by weight of the composition, preferably from about 0 to 40% by weight of the composition and more preferably from about 0 to 35% by weight of the composition.

The photopolymerizable composition of this invention preferably includes a stabilizer to prevent or reduce degradation which leads to property deterioration such as cracking and delamination after heat aging at 190° C. in air for 24 hrs. as defined by ASTM D 4538-90A and yellowing (coloration of greater than 8 on the Gardner Color Scale as determined by ASTM D 1544-80) after such heat aging.

Such stabilizers include UV absorbers, light stabilizers, and antioxidants. UV absorbers include hydroxyphenyl benzotriazoles, such as 2-[2-hydroxy-3,5-di(1,1-dimethylbenzyl)phenyl]-2-H-benzotriazole (Tinuvin 900), Poly(oxy-1,2-ethanediyl), α-(3-(3-(2H-benzyotriazol-2-yl)-5-(1,1-dimethylethyl)-4-hydroxyphenyl)-1-oxopropyl)-ω-hydroxy (Tinuvin 1130), and 2-[2-hydroxy-3,5-di(1,1-dimethylpropyl)phenyl]-2-H-benzotriazole (Tinuvin 238), and from hydroxybenzophenones, such as 4-methoxy-2-hydroxybenzophenone and 4-n-octoxy-2-hydrox benzophenone. Light stabilizers include hindered amines such as 4-hydroxy-2,2,6,6-tetramethylpiperidine, 4-hydroxy-1,2,2,6,6-pentamethylpiperidine, 4-benzoyloxy-2,2,6,6-tetramethylpiperidine, bis(2,2,6,6-tetramethyl-4-piperidinyl)sebacate, (Tinuvin 770), bis(1,2,2,6,6-pentamethyl-4-piperidinyl)sebacate (Tinuvin 292), bis(1,2,2,6,6-pentamethyl-4-piperidinyl)-2-n-butyl-2-(3,5-di-tert-butyl-4-hydroxybenzyl)malonate (Tinuvin 144), polyester of succinic acid with N-β-hydroxy-ethyl-2,2,6,6-tetramethyl-4-hydroxy-piperidine (Tinuvin 622). Antioxidants include substituted phenols such as 1,3,5-trimethyl-2,4,6-tris(3,5-di-tert-butyl)-4-hydroxybenzyl)benzene, 1,1,3-tris-(2-methyl-4-hydroxy-5-tert-butylphenyl)butane, 4,4'-butylidene-bis-(6-tert-butyl-3-methyl)phenol, 4,4'-thiobis-(6-tert-butyl-3-methyl)phenol, tris-(3,5-di-tert-butyl-4-hydroxybenzyl)isocyanurate, cetyl-3,5-di-tert-butyl-4-hydroxybenzene (Cyasorb UV2908), 3,5-di-tert-butyl-4-hydroxybenzoic acid, 1,3,5-tris-(tert-butyl-3-hydroxy-2,6-dimethylbenzyl) (Cyasorb 1790), stearyl-3-(3,5-di-tert-butyl-4-hydroxyphenyl)proprionate (Irganox 1076), pentaerythritol tetrabis(3,5-di-tert-butyl-4-hydroxyphenyl) (Irganox 1010), thiodiethylene-bis-(3,5-di-tert-butyl-4-hydroxy)hydrocinnamate (Irganox 1035). The preferred stabilizers used in this invention are antioxidants. Preferred antioxidants are selected from substituted phenols such as 1,3,5-trimethyl-2,4,6-tris(3,5-di-tert-butyl)-4-hydroxybenzyl)benzene, 1,1,3-tris-(2-methyl-4-hydroxy-5-tert-butylphenyl)butane, 4,4'-butylidene-bis-(6-tert-butyl-3-methylphenol, 4,4'-thiobis-(6-tert-butyl-3-methylphenol, tris-(3,5-di-tert-butyl-4-hydroxybenzyl)isocyanurate, cetyl-3,5-di-tert-butyl-4-hydroxybenzene (Cyasorb UV 2908), 3,5-di-tert-butyl-4-hydroxybenzoic acid, 1,3,5-tris-tert-butyl-3-hydroxy-2,6-dimethylbenzyl) (Cyasorb 1790), stearyl-3-(3,5-di-tert-butyl-4-hydroxyphenyl)proprionate (Irganox 1076), pentaerythritol tetrabis(3,5-di-tert-butyl-4-hydroxyphenyl) (Irganox 1010), thiodiethylene-bis-(3,5-di-tert-butyl-4-hydroxy)hydrocinnamate (Irganox 1035). The most preferred stabilizers include pentaerythritol tetrabis(3,5-di-tert-butyl-4-hydroxyphenyl) (Irganox 1010), thiodiethylene-bis-(3,5-di-tert-butyl-4-hydroxy) hydrocinnamate (Irganox 1035), and stearyl-3-(3,5-di-tert-butyl-4-hydroxyphenyl)proprionate (Irganox 1076).

The amount of stabilizers in the composition may vary widely and is usually from about 0.1 to 10% by weight of the composition. The amount of stabilizer is preferably from about 0.1 to 5% by weight of the composition and more preferably from about 0.2 to 3% by weight of the composition.

The polymerizable composition of this invention is useful as a precursor for forming the photopolymer of this invention. The photopolymer of the invention is conventionally prepared by exposing the polymerizable composition of this invention to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, as for example light from a laser.

Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art. See for example in S. P. Pappas Ed. "Radiation Curing: Science and Technology" Plenum Press, New York, N.Y.; D. R. Randell Ed., "Radiation Curing of Polymers, II, Royal Society of Chemistry, Cambridge, Mass.; and C. E. Hoyle and J. F. Kristle, Ed., "Radiation Curing of Polymeric Materials", American Chemical Society. Accordingly, they will not be described herein in great detail.

The photopolymer of this invention has one or more advantages over prior art polymers used to form the light transmissive element of light transmissive devices. For example, the photopolymer has less discoloration on exposure to a temperature of about 190° C. for 24 hrs in air than other photopolymers due to the use of the essential aryl acrylate monomer. The amount of discoloration on a Gardner Color Scale is usually equal to or less than about 8 points, preferably equal to or less than about 6 points, more preferably equal to or less than about 5 points, and most preferably equal to or less than about 3 points after exposure to 190° C. for 24 hrs as determined by ASTM D1544-80. The photopolymer of this invention also has no or substantially no cracking or delamination when formed in a layer of thickness 10–200 micron on a glass substrate when exposed to a temperature of 190° C. in air for 24 hrs as defined by ASTM D4538-90A. Establishment of the absence of cracking and delamination in the photopolymer film is carried out by visual observation of the thermally treated samples under a 50× microscope. This unique feature of the photopolymer is believed to result from use of the essential aryl acrylate monomer.

The photopolymer of this invention can be used in the formation of the light transmissive element of optical devices. Illustrative of such devices are planar optical slab waveguides, channel optical waveguides, optical couplers, micro-optical elements and the like which are described in more detail in U.S. Pat. Nos. 4,609,252; 4,877,717 and 5,136,682. In the preferred embodiments of this invention, the polymerizable composition and photopolymer of this invention are used in the fabrication of organic optical waveguides devices such as slab, channel and rib waveguides and waveguide couplers as for example those described in U.S. Pat. No. 4,609,252 having a light transmissive element formed from the photopolymer of this invention. In the more preferred embodiments of the invention, the waveguide is of the type comprising a substrate having a waveguide strip or layer on the surface thereof. Such waveguides are formed by applying a thin or thick film of the polymerizable composition of this invention on to the surface of a suitable substrate. The film may be formed by any of a number of methods known in the art, such as spin coating, dip coating, roller coating, doctor blading, evaporation or the like.

The substrate may be any material on which it is desired to establish a waveguide including semiconductor materials such as silicon, silicon oxide, gallium arsenide, silicon nitride, glass, quartz, plastics, ceramics, crystalline materials and the like. The substrate may or may not contain other devices, either topographical features such as grooves or electrical circuits or electro-optic devices such as laser diodes. On substrates where the light transmissive region is an organic layer of lower refractive index than the substrate material, it is necessary to first form a layer of refractive index lower than the organic waveguide material. Such a layer is known in the art as a buffer layer and may be comprised of a semiconductor oxide, a lower refractive index polymer or a spin-on silicon dioxide glass material.

Once the photopolymerizable composition is formed onto the substrate in a thin or thick film, actinic radiation is directed onto the film in order to delineate the light transmissive region. By delineating, it is meant that the position and dimensions of the light transmissive device is determined by the pattern of the actinic radiation upon the surface of the film on the substrate. The pattern radiation must be chosen so that the photopolymerizable composition is polymerized in the desired pattern and so that other regions of the film remain unreacted.

Sources of actinic radiation and the wavelength of the radiation may vary widely, and any conventional wavelengths and sources can be used. It is preferable that the photochemical excitation be carried out with relatively short wavelength (or high energy) radiation so that exposure to radiation normally encountered before processing (e.g., room lights) will not prematurely polymerize the polymerizable material. Alternatively, the processsing can utilize a multiphoton process initiated by a high intensity source of actinic radiation such as a laser. Thus, exposure to ultraviolet light (300–400 nm wavelength) is convenient. Also, exposure by deep ultraviolet light (190–300 nm wavelength) is useful. Convenient sources are high pressure xenon or mercury-xenon arc lamps fitted with appropriate optical filters to select the desired wavelengths for processing. Also, short wavelength coherent radiation is useful for the practice of this invention. An argon ion laser operating in the "UV" mode at several wavelengths near 350 nm is desireable. Also, a frequency-doubled Argon ion laser with output near 257 nm wavelength is highly desirable. Electron beam or ion beam excitation may also be utilized.

Control of the spatial profile of the actinic radiation, that is, where it falls upon the layer of photo-polymerizable material may be achieved by conventional methods. For example, in one conventional method, a mask bearing the desired light transmissive pattern is interspersed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for "printing" the light transmissive pattern onto the film. Another conventional method of spatial control is to use a source of actinic radiation which comprises a directed or focussed beam such as a laser or electron beam. Such a beam intersects only a small area of the photo-polymerizable material film surface. The pattern of the desired light transmissive regions is achieved by moving this small intersection point around on the film surface either by scanning the beam in space or by moving the substrate so that the intersection point is changed relative to a stationary beam. These types of exposure using a beam source are known in the art as "direct-write" methods.

By choosing the spatial characteristics of irradiation it is possible to create light transmissve regions on the surface of the substrate as for example slab and channel waveguides. A slab waveguide is one in which the optical wave is confined only to the plane of the film. A channel waveguide is one in which the optical wave is also confined laterally within the film. A channel structure is necessary for many nonlinear and electro-optic devices because it allows the light to be directed to certain areas of the substrate as well as providing a mechanism for splitting and combining optical waves. After the photopolymerizable composition has been polymerized to form the predetermined pattern of the photopolymer of this invention on the surface of the substrate, the pattern is then developed to leave behind the predetermined pattern. Any conventional development method can be used, as for example, conventional photolithographic techniques as discussed by William S. DeForest in the book entitled "Photoresist Materials and Process," McGraw-Hill Company, New York, (1975).

The following examples are presented to better illustrate the invention and should not be construed as limitations thereof.

EXAMPLE 1

Figure 1B:
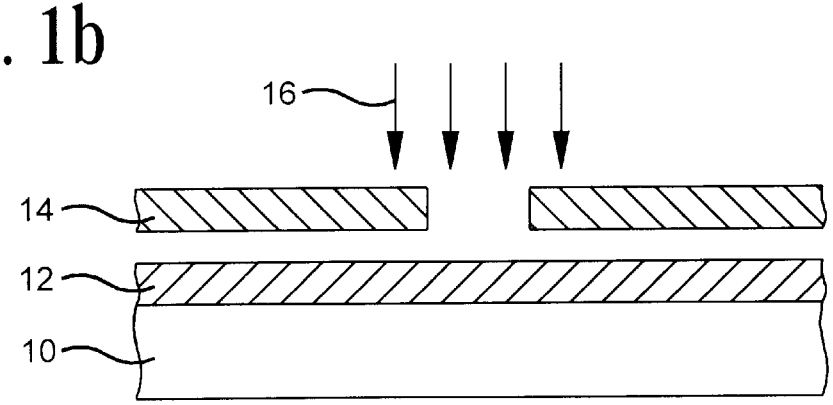
Figure 1C:
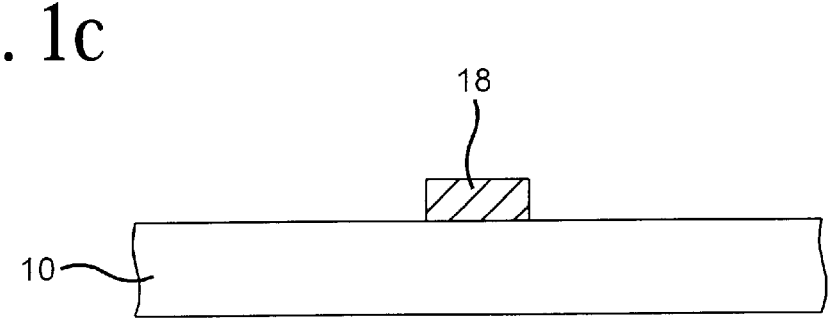

FIG. 1 shows a substrate 10 such as glass or fused quartz having the photopolymerizable composition of this invention on a surface thereof to form layer 12. The composition of this photopolymerizable material can be varied to produce the desired waveguiding characteristics in the final device but is preferably such that when polymerized forms the photopolymer of this invention which is transmissive to light waves in the range 400–1600 nm and which has an index of refraction in the range of from about 1.40 to about 1.60. In this manner, the device of the present invention can accommodate optical fibers having various refractive indices. The organic layer 12 may be deposited by any suitable conventional procedure, as for example dipping the substrate 10 into a solution of the photoactive composition. The photopolymerizable composition is deposited to a thickness of 5 to 500 micrometers in order to form a device which is compatible with conventional glass and plastic fibers which have light carrying cores of typically 5 to 500 micrometers in diameter. The deposited photopolymerizable composition may be removed from the back (or bottom) side of the substrate 10 as shown in FIG. 1 by washing that side with acetone. Optionally, the photopolymerizable composition deposited on the back side of the substrate may be left in place.

Next, using known photolithographic techniques, as discussed, for example, by William S. DeForest in the book entitled "Photoresist Materials and Processes," McGraw-Hill Book Company, New York, 1975, the structure of FIG. 1 is exposed to a beam 16 of ultraviolet light, through an off-contact mask 14 which is placed a distance of from 1 to 10 micrometers from the substrate 10 and which defines the desired geometry of the final device as indicated in FIG. 1 to cause the photopolymerizable composition to polymerize into a waveguiding photopolymer. The deposited and irradiated layer 12 is developed with an appropriate solvent to remove the undesired unpolymerized portion. The pattern 18 of the exposed photopolymerizable composition which remains deposited on the substrate 10 has the configuration which was defined by the mask 14.

FIG. 2 shows a preferred embodiment of the present invention in which the predetermined planar geometry transmission path of the device is in the form of the letter "Y". The substrate 10 has deposited thereon the waveguiding pattern 18 which was formed in a manner similar to that described in FIG. 1, using a Y-shaped mask for mask 14 of FIG. 1. The device shown in FIG. 2 finds utility as a waveguide coupler.

COMPARATIVE EXAMPLE 1

A liquid mixture containing 10 parts of Genomer T-1600 (a trifunctional polyester urethane acrylate from Biddle-Sawyer, viscosity 48,000 mPa ), 20 parts of 1,6-hexanediol diacrylate (HDDA, from Scientific Polymer Products), and 0.6 part of a liquid photoinitiator mixture consisting of 0.2 part of Darocur 1173 ($\alpha,\alpha$-dimethyloxy-$\alpha$-hydroxy acetophenone, EM Industries), 0.2 part of Irgacure 500 (1:1 by weight mixture of 1-hydroxy-cyclohexyl-phenyl ketone and benzophenone, Ciba-Geigy) and 0.2 part of Irgacure 651 (benzidimethyl ketal, Ciba-Geigy) was prepared and filtered through a 0.2 micron Teflon membrane. The liquid mixture was spread on a glass plate to form a layer of 0.2 mm thick, followed by subjecting the layer under nitrogen cover to UV radiation from a medium pressure mercury lamp at an intensity of 25mW/cm$^2$ for a duration of 0.5 minute. The liquid layer turned into a solid coating after irradiation. The coated substrates were then placed in an air circulated oven and thermal aged at 190° C. for 24 hours. The purging rate of air was 5–10 l/h. The aged sample was deep brown in color, corresponding to a rate of larger than 18 on the Gardner color scale, as described by ASTM D1544-80. There were no delamination from the substrate, nor was an cracking in the layer; as defined by ASTM D4538-90a. The result of inspection was collectively shown in Table 1.

COMPARATIVE EXAMPLE 2

The procedure of Comparative Example 1 was repeated except the HDDA was replaced by IBOA (isobornyl acrylate, Scientific Polymer Products). The aged samples was deep brown in color, corresponding to a larger than 18 rate on a Gardner color scale. There were no delamination from the substrate, nor was an cracking in the layer. The result of inspection was collectively shown in Table 1.

COMPARATIVE EXAMPLE 3

The procedure of Comparative Example 1 was repeated except the HDDA was replaced by TMPTA (trimethylolpropane triacrylate, Scientific Polymer Products). The aged sample was deep brown in color, corresponding to a larger than 18 rate on a Gardner color scale. There were no delamination from the substrate, nor was an cracking in the layer. The result of inspection was collectively shown in Table 1.

COMPARATIVE EXAMPLE 4

The procedure of Comparative Example 1 was repeated except the Genomer T-1600 was replaced by Genomer T-1200 (a trifunctional polyester urethane acrylate from Biddle-Sawyer, viscosity 75,000 mPa). The aged samples was deep brown in color, larger than 18 as rated by Gardner color scale. There were no delamination from he substrate, nor was an cracking in the layer. The result of inspection was collectively shown in Table 1.

COMPARATIVE EXAMPLE 5

The procedure of Comparative Example 1 was repeated except the Genomer T-1600 was replaced by Genomer T-1030 (a trifunctional polyester urethane acrylate from Biddle-Sawyer). The aged samples was light brown in color, corresponding to a rate of 15 on the Gardner color scale. The polymer layer was delaminated from the glass plate and slightly cracked. The result of inspection was collectively shown in Table 1.

COMPARATIVE EXAMPLE 6

The procedure of Example 1 was repeated except the Genomer T-1600 was replaced by Ebercyl 8800 (oligomeric aliphatic urethane acrylate with a functionality of 2.5, Radcure). The aged sample was brown in color, corresponding to a rate of 18 on the Gardner color scale. The polymer layer was delaminated from the glass plate and slightly cracked. The result of inspection was collectively shown in Table 1.

TABLE 1

Comparison of Oligomeric Acrylates Containing Polyurethane Segments After Thermal-aged at 190° C. for 24 hours

| Example # | Monomer 1 | Monomer 2 | Discolor.[1] | Delam.[2] | Cracking[3] |
|---|---|---|---|---|---|
| C1 | Genomer T-1600 | HDDA | >18 | No | No |
| C2 | Genomer T-1600 | IBOA | >18 | No | No |
| C3 | Genomer T-1600 | TMPTA | >18 | No | No |
| C4 | Genomer T-1200 | HDDA | >18 | Yes | Yes |
| C5 | Genomer T-1030 | HDDA | 18 | Yes | Yes |
| C6 | Ebercyl 8800 | HDDA | 15 | Yes | Yes |

[1]Discoloring was rated on a Gardner Color Scale, according to ASTM D1544-80.
[2]Delamination was defined according to by ASTM D4538-90a.
[3]Cracking was defined according to by ASTM D4538-90a.

COMPARATIVE EXAMPLE 7

A liquid mixture containing 10 parts of TMPEOTA (Scientific Polymer Products, ethoxylated trimethylolpropane triacrylate) and 0.2 part of a liquid photoinitiator mixture consisting of 0.066 part of Darocur 1173, 0.066 part of Irgacure 500, and 0.066 part of Irgacure 651 was prepared. The procedure of photocuring and thermal testing in Example 1 was then repeated. The aged sample was slightly brown in color, corresponding to a rate of 12 on the Gardner color scale. The polymer layer was delaminated from the glass plate and seriously cracked. The result of inspection was collectively shown in Table 2.

COMPARATIVE EXAMPLE 8

The procedure of Comparative Example 7 was repeated except the TMPEOTA was replaced by TMPTA (Scientific Polymer Products, trimethylolpropane triacrylate). The aged sample was slightly yellow in color, corresponding to a rate of 6 on the Gardner color scale. The polymer layer was delaminated from the glass plate and seriously cracked. The result of inspection was collectively shown in Table 2.

COMPARATIVE EXAMPLE 9

The procedure of Comparative Example 7 was repeated except the TMPEOTA was replaced by NPPOGDA (Scientific Polymer Products, propoxylated neopentyl glycol diacrylate). The aged sample was slightly brown in color, corresponding to a rate of 13 on the Gardner color scale. The polymer layer was delaminated from the glass plate and cracked. The result of inspection was collectively shown in Table 2.

COMPARATIVE EXAMPLE 10

The procedure of Comparative Example 7 was repeated except the TMPEOTA was replaced by GPTA (Scientific Polymer Products, glyceryl propoxylated triacrylate). The procedure of photocuring and thermal testing in Example 1 was then repeated. The aged sample was brown in color, corresponding to a rate of 16 on the Gardner color scale. The polymer layer was delaminated from the glass plate and cracked. The result of inspection was collectively shown in Table 2.

COMPARATIVE EXAMPLE 11

The procedure of Comparative Example 7 was repeated except the TMPEOTA was replaced by TPGDA (Scientific Polymer Products, tripropylene glycol diacrylate). The aged samples was slightly brown in color, corresponding to a rate of 14 on the Gardner color scale. The polymer layer was delaminated from the glass plate and slightly cracked. The result of inspection was collectively shown in Table 2.

COMPARATIVE EXAMPLE 12

The procedure of Comparative Example 7 was repeated except the TMPEOTA was replaced by PEG200DA (Scientific Polymer Products, polyethylene glycol-200 diacrylate). The aged sample was slightly brown in color, corresponding to a rate of 13 on the Gardner color scale. The polymer layer was delaminated from the glass plate and cracked. The result of inspection was collectively shown in Table 2.

COMPARATIVE EXAMPLE 13

The procedure of Comparative Example 7 was repeated except the TMPEOTA was replaced by PEG400DA (Scientific Polymer Products, polyethylene glycol-400 diacrylate). The aged samples was brown in color, corresponding to a rate of 16 on the Gardner color scale. The polymer layer was delaminated from the glass plate and cracked. The result of inspection was collectively shown in Table 2.

COMPARATIVE EXAMPLE 14

The procedure of Comparative Example 7 was repeated except the TMPEOTA was replaced by DTMPTTA (Scientific Polymer Products, ditrimethylolpropane tetraacrylate). The aged sample was yellow in color, corresponding to a rate of 8 on the Gardner color scale. The polymer layer was delaminated from the glass plate and racked. The result of inspection was collectively shown in Table 2.

COMPARATIVE EXAMPLE 15

The procedure of Comparative Example 7 was repeated except the TMPEOTA was replaced by HDDA. The aged samples was slightly yellow in color, corresponding to a rate of 6 on the Gardner color scale. The polymer layer was delaminated from the glass plate and cracked. The result of inspection was collectively shown in Table 2.

COMPARATIVE EXAMPLE 16

The procedure of Comparative Example 7 was repeated except the TMPEOTA was replaced by a mixture containing 7 parts of CN-112C60 (Sartomer, ethoxylated Novolac acrylate) and 3 parts of TMPTA. The procedure of photocuring and thermal testing in Example 1 was then repeated. The aged samples was slightly brown in color, corresponding to a rate of 12 on the Gardner color scale. The polymer layer was delaminated from the glass plate with no crack. The result of inspection was collectively shown in Table 2.

COMPARATIVE EXAMPLE 17

The procedure of Comparative Example 7 was repeated except the TMPEOTA was replaced by a mixture containing 7 parts of AS-X95 (Biddle-Sawyer, Oligomeric polyester acrylate) and 3 parts of HDODA. The aged sample was slightly brown in color, corresponding to a rate of 8 on the Gardner color scale. The polymer layer was delaminated from the glass plate and slightly cracked. The result of inspection was collectively shown in Table 2.

COMPARATIVE EXAMPLE 18

The procedure of Comparative Example 7 was repeated except the TMPEOTA was replaced by SR9008 (Sartomer, trifunctional alkoxylated acrylate). The aged sample was yellow in color, corresponding to a rate of 8 on the Gardner color scale. The polymer layer was delaminated from the glass plate with no crack. The result of inspection was collectively shown in Table 2.

COMPARATIVE EXAMPLE 19

The procedure of Comparative Example 7 was repeated except the TMPEOTA was replaced by SR9012 (Sartomer, trifunctional oligomeric polyester acrylate). The aged sample was yellow in color, corresponding to a rate of 6 on the Gardner color scale. The polymer layer was delaminated from the glass plate and cracked. The result of inspection was collectively shown in Table 2.

COMPARATIVE EXAMPLE 20

The procedure of Comparative Example 7 was repeated except the TMPEOTA was replaced by a mixture containing 7 parts of TITA (Scientific Polymer Products, tris-(2-hydroxyethyl)isocyanurate triacrylate) and 3 parts of HDDA. The aged sample was slightly brown in color, corresponding to a rate of 12 on the Gardner color scale. The polymer layer was delaminated from the glass plate and cracked. The result of inspection was collectively shown in Table 2.

EXAMPLE 2

The procedure of Comparative Example 7 was repeated except the TMPEOTA was replaced by EBDA (Scientific Polymer Products, ethoxylated bisphenol 'A' diacrylate). The aged sample was slightly yellow in color, corresponding to a rate of 5 on the Gardner color scale. The polymer layer adhered to the glass plate with no delamination and no crack. The result of inspection was collectively shown in Table 2.

EXAMPLE 3

The procedure of Comparative Example 7 was repeated except the TMPEOTA was replaced by EHFBDA (ethoxylated hexafluoro-bisphenol 'A' diacrylate). The aged sample was slightly yellow in color, corresponding to a rate of 4 on the Gardner color scale. The polymer layer adhered to the glass plate with no delamination and no crack. The result of inspection was collectively shown in Table 2.

TABLE 2

Comparison of Various Acrylates After Thermal-aged at 190° C. for 24 hours

| Example # | Monomer 1 | Monomer 2 | Dis-color.(1) | Delam.(2) | Cracking(3) |
|---|---|---|---|---|---|
| C7 | TMPEOTA | — | 12 | Yes | Yes |
| C8 | TMPTA | — | 6 | Yes | Yes |
| C9 | NPPOGDA | — | 13 | Yes | Yes |
| C10 | GPTA | — | 16 | Yes | Yes |
| C11 | TPGDA | — | 14 | Yes | Yes |
| C12 | PEG200DA | — | 13 | Yes | Yes |
| C13 | PEG400DA | — | 16 | Yes | Yes |
| C14 | DTMPTTA | — | 8 | Yes | Yes |
| C15 | HDDA | — | 6 | Yes | Yes |
| C16 | CN-112C60 | TMPTA | 12 | Yes | No |
| C17 | AS-X95 | HDDA | 8 | Yes | Yes |
| C18 | SR9008 | — | 8 | Yes | No |
| C19 | SR9012 | — | 6 | Yes | Yes |
| C20 | TITA | HDDA | 12 | Yes | Yes |
| 2 | EBDA | — | 5 | No | No |
| 3 | EHFBDA | — | 4 | No | No |

(1)Discoloring was rated on a Gardner Color Scale, according to ASTM D1544-80
(2)Delamination was defined according to by ASTM D4538-90a.
(3)Cracking was defined according to by ASTM D4538-90a.

EXAMPLE 4

The procedure of Example 2 was repeated except the 10 parts of EBDA was replaced by a mixture of 6.6 parts of EBDA and 3.4 parts of HDDA. The aged samples were yellow in color, corresponding to a rate of 8–9 on the Gardner color scale. The polymer layer adhered to the glass plate with no delamination and no crack. The result of inspection was collectively shown in Table 3.

The liquid composition prior to photocuring was deposited onto glass or silicon substrates by spin-coating. Depending on the spinning rate, the thickness of the photocured polymer was able to be controlled at 0.5–5 micron.

EXAMPLE 5

The procedure of Example 2 was repeated except the 10 parts of EBDA was replaced by a mixture of 6.6 parts of EBDA and 3.4 parts of TMPTA. The aged sample was slightly yellow in color, corresponding to a rate of 5–6 on the Gardner color scale. The polymer layer adhered to the glass plate with no delamination and no crack. The result of inspection was collectively shown in Table 3.

The liquid composition prior to photocuring was deposited onto glass or silicon substrates by spin-coating. Depending on the spinning rate, the thickness of the photocured polymer was able to be controlled at 0.5–5 micron.

EXAMPLE 6

The procedure of Example 2 was repeated except the 10 parts of EBDA was replaced by a mixture of 6.6 parts of EBDA and 3.4 parts of ethoxylated trimethylol propane triacrylate (ETMPTA). The aged samples were yellow in color, corresponding to a rate of 8–9 on the Gardner color scale. The polymer layer adhered to the glass plate with no delamination and no crack. The result of inspection was collectively shown in Table 3.

The liquid composition prior to photocuring was deposited onto glass or silicon substrates by spin-coating. Depending on the spinning rate, the thickness of the photocured polymer was able to be controlled at 0.5–5 micron.

EXAMPLE 7

The procedure of Example 2 was repeated except the 10 parts of EBDA was replaced by a mixture of 6.6 parts of EBDA and 3.4 parts of SR9012 (Sartomer). The aged samples were yellow in color, corresponding to a rate of 8–9 on the Gardner color scale. The polymer layer was delaminated from the glass plate and cracked. The result of inspection was collectively shown in Table 3.

TABLE 3

Comparison of Different Diluents for EBDA After the Photopolymer Aged at 190° C. for 24 hours

| Example # | Monomer 1 | Monomer 2 | Dis-color.(1) | Delam.(2) | Cracking(3) |
|---|---|---|---|---|---|
| 2 | EBDA | — | 5 | No | No |
| 4 | EBDA | HDDA | 8–9 | No | No |
| 5 | EBDA | TMPTA | 5–6 | No | No |
| 6 | EBDA | ETMPTA | 8–9 | No | No |
| 7 | EBDA | SR9012 | 8–9 | Yes | Yes |

(1)Discoloring was rated on a Gardner Color Scale, according to ASTM D1544-80.
(2)Delamination was defined according to by ASTM D4538-90a.
(3)Cracking was defined according to by ASTM D4538-90a.

EXAMPLE 8

The procedure of Example 5 was repeated except an extra 0.05 part of Tinuvan770 (bis(2,2,6,6-tetramethyl-4-piperidinyi)sebacate, Ciba-Geigy) was added. Tinuvan 770 is a hindered amine light stabilizer. The aged sample was yellow in color, corresponding to a rate of 9–10 on the Gardner color scale. The polymer layer adhered to the glass plate with no delamination and no crack. The result of inspection was collectively shown in Table 4.

EXAMPLE 9

The procedure of Example 5 was repeated except an extra 0.05 part of AM806 (Ferro Corp.) was added. AM806 is also a hindered amine light stabilizer. The aged sample was yellow in color, corresponding to a rate of 9–10 on the Gardner color scale. The polymer layer adhered to the glass plate with no delamination and no crack. The result of inspection was collectively shown in Table 4.

EXAMPLE 10

The procedure of Example 5 was repeated except an extra 0.05 part of Tinuvan238 (2-[2-hydroxy-3,5-di(1,1-dimethylpropyl)phenyl]2-H-benzotriazole, Ciba-Geigy) was added. Tinuvan238 is a benzotriazole UV absorber. The photocuring took 2 minutes to complete. The aged sample was yellow in color, corresponding to a rate of 9–10 on the Gardner color scale. The polymer layer adhered to the glass plate with no delamination and no crack. The result of inspection was collectively shown in Table 4.

EXAMPLE 11

The procedure of Example 5 was repeated except an extra 0.05 part of AM340 (Ferro Corp.) was added. AM340 is also a benzotriazole UV absorber. The photocuring took 2 minutes to complete. The aged sample was yellow in color, corresponding to a rate of 9–10 on the Gardner color scale. The polymer layer adhered to the glass plate with no delamination and no crack. The result of inspection was collectively shown in Table 4.

EXAMPLE 12

The procedure of Example 5 was repeated except an extra 0.05 part of Irganox 1010 (Ciba-Geigy, pentaerythritol tetrakis[3,5-di-tert-butyl-4-hydroxyhydrocinnamate] was added. Irganox1010 is a hindered phenol type antioxidant. The aged samples were only very lightly discolored, corresponding to a rate of 2–3 on the Gardner color scale. The polymer layer adhered to the glass plate with no delamination and no crack. The result of inspection was collectively shown in Table 4.

EXAMPLE 13

The procedure of Example 2 was repeated except the amount of Irganox1010 was reduced to 0.01 part. The aged samples were only very lightly discolored, corresponding to a rate of 2–3 on the Gardner color scale. The polymer layer adhered to the glass plate with no delamination and no crack. The result of inspection was collectively shown in Table 4.

EXAMPLE 14

The procedure of Example 5 was repeated except an extra 0.05 part of Irganox 1035 (Ciba-Geigy, thio(diethylene-bis (3,5-di-tert-butyl-4-hydroxy)hydrocinnamate) was added. Irganox 1035 is a hindered phenol type antioxidant. The aged sample was lightly discolored, corresponding to a rate of 3–4 on the Gardner color scale.

The polymer layer adhered to the glass plate with no delamination and no crack. The result of inspection was collectively shown in Table 4.

EXAMPLE 15

The procedure of Example 5 was repeated except an extra 0.05 part of Irganox1076 (Ciba-Geigy, stearyl-3-[3,5-di-tert-butyl-4-hydroxyphenyl]proprionate) was added. Irganox1076 is a hindered phenol type antioxidant. The aged sample was very lightly discolored, corresponding to a rate of 2–3 on the Gardner color scale. The polymer layer adhered to the glass plate with no delamination and no crack. The result of inspection was collectively shown in Table 4.

EXAMPLE 16

The procedure of Example 5 was repeated except an extra 0.05 part of Irganox1520 (Ciba-Geigy, 2,4-bistoctylthiomethyll-o-cresol) was added. Irganox 1520 is a hindered phenol type antioxidant. The aged sample was lightly discolored, corresponding to a rate of 4–5 on the Gardner color scale. The polymer layer adhered to the glass plate with no delamination and no crack. The result of inspection was collectively shown in Table 4.

EXAMPLE 17

The procedure of Example 5 was repeated except an extra 0.05 part of Cyasorb UV2908 (American Cyanamid, cetyl-3,5-di-tert-butyl-4-hydroxybenzene) was added. Cyasorb UV2908 is a hindered phenol type antioxidant. The aged sample was very lightly discolored, corresponding to a rate of 2–3 on the Gardner color scale. The polymer layer adhered to the glass plate with no delamination and no crack. The result of inspection was collectively shown in Table 4.

EXAMPLE 18

The procedure of Example 5 was repeated except additional 0.02 part of Irganox1010, 0.05 part of Tinuvin 770, and 0.05 part of Tinuvin-238 was added. Irganox1010 is a hindered phenol type antioxidant, Tinuvan770 is a hindered amine light stabilizer and Tinuvan238 is a benzotriazole UV absorber. The photocuring took 2 minutes to complete. The aged sample was yellow, corresponding to a rate of 7–8 on the Gardner color scale. The polymer layer adhered to the glass plate with no delamination and no crack. The result of inspection was collectively shown in Table 4.

EXAMPLE 19

The procedure of Example 5 was repeated except additional 0.02 part of Irganox1010 and 0.05 part of Tinuvin 770 was added. Irganox1010 is a hindered phenol type antioxidant and Tinuvan770 is a hindered amine light stabilizer. The aged sample was very lightly discolored, corresponding to a rate of 3–4 on the Gardner color scale. The polymer layer adhered to the glass plate with no delamination and no crack. The result of inspection was collectively shown in Table 4.

TABLE 4

Comparison of Various Additives After Polymer aged at 190° C. for 24 hours

| Example # | Additive 1 | Additive 2 | Discolor.[1] | Delam.[2] | Cracking[3] |
|---|---|---|---|---|---|
| 5 | — | — | 5 | No | No |
| 8 | Tinuvan770 | — | 9–10 | No | No |
| 9 | AM806 | — | 9–10 | No | No |
| 10[4] | Tinuvan238 | — | 9–10 | No | No |
| 11[4] | AM340 | — | 9–10 | No | No |
| 12 | Irganox1010 (0.05 part) | — | 2–3 | No | No |
| 13 | Irganox1010 (0.02 part) | — | 2–3 | No | No |
| 14 | Irganox 1035 | — | 4–5 | No | No |
| 15 | Irganox1076 | — | 3–4 | No | No |
| 16 | Irganox1520 | — | 4–5 | No | No |
| 17 | C- UV2908 | — | 2–3 | No | No |
| 18[4],[5] | Irganox1010 | Tinuvan 238 | 7–8 | No | No |
| 19[4] | Irganox1010 | Tinuvan 238 | 4–5 | Yes | Yes |

[1]Discoloring was rated on a Gardner Color Scale, according to ASTM D1544-80.
[2]Delamination was defined according to by ASTM D4538-90a.
[3]Cracking was defined according to by ASTM D4538-90a.
[4]The photocuring rate was much slower when using bentriazol UV absorber as additive.
[5]Another additive - Tinuvan770 was added.

EXAMPLE 20

A 5 cm long polymer optical waveguide was prepared by photoexposing through a pattern mask a photosensitive monomer mixture consisting of 96 parts ethoxylated bisphenol A diacrylate, 33 parts trimethylol propane triacrylate, 3 parts Irganox 1010, 1 part Darocur 1173, 1 part Irgacure 651 and 1 part Irgacure 500 followed by development with acetone. The waveguide was pigtailed with 100/140 micron glass optical fibers and overcoated with a reactive monomer mixture consisting of 58 weight percent of the above monomer mixture and 42 weight percent of a mixture consisting of 50 parts Genomer T1600 urethane acrylate, 98 parts 1,6-hexanediol diacrylate, 1 part Darocur 1173, 1 part Irgacure 651 and 1 part Irgacure 500. The substrate for the polymer optical waveguide was a polyimide circuit board material with a thin layer of the same 58:42 mixture previously listed. Both the substrate coating and the overcoat layer were cured by blanket exposure from a UV xenon lamp under a nitrogen atmosphere. 810 nm laser light was coupled into one end of the polymer optical waveguide via its glass optical fiber pigtail. The power which was transmitted through the waveguide was measured by connecting the glass optical fiber attached to the opposite end of the polymer waveguide to a silicon photodetector coupled to an optical power meter. After obtaining the initial power transmission of the polymer optical waveguide, the substrate bearing the polymer waveguide was placed on top of a hotplate and heated to 190° C., as determined by a thermocouple element attached to the substrate next to the polymer waveguide. The temperature of the polymer optical waveguide was maintained at 190° C. for a total of 45 hours, after which the 810 nm laser light was again passed through the polymer waveguide and its power was remeasured. By subtracting the two power measurements and dividing by the 5 cm length of the waveguide it was determined that the extended exposure to this high temperature treatment had increased the propagation loss of the polymer optical waveguide by only 0.13 dB/cm. Thus the material of the waveguide was demonstrated to be highly resistant to thermal degradation of its optical properties.

What is claimed is:

1. A method of thermally stabilizing an optically transparent waveguide, which waveguide comprises a patterned photopolymer on a substrate formed by photopolymerizing a photopolymerizable composition, the photopolymerizable composition comprising one or more unsaturated monomers selected from the group consisting of 1,6-hexanediol diacrylate, trimethylolpropane triacrylate, pentaerythritol triacrylate, ethoxylated trimethylolpropane triacrylate, glyceryl, propoxylated triacrylate, pentaerythritol tetraacrylate, dipentaerythritol pentaacrylate and di(trimethylolpropane) tetraacrylate, and at least one photoinitiator capable of activating polymerization of said monomers when said photopolymerizable composition is exposed to actinic radiation the method comprising incorporating into said photopolymerizable composition from about 35% to about 99.9% by weight of the photopolymerizable composition of at least one ethylenically unsaturated monomer selected from the group consisting of ethoxylated bisphenol A diacrylate, ethoxylated hexafluorobisphenol A diacrylate, and propoxylated bisphenol A diacrylate wherein said photopolymer exhibits a coloration on the Gardner Color Scale equal to or less than 8 as determined by ASTM D1544-80 upon exposure to a temperature of 190° C. in air for 24 hours.

2. The method of claim 1 wherein said coloration is equal to or less than about 6 on the Gardner Color Scale.

3. The method of claim 1 wherein said coloration is equal to or less than about 5 on the Gardner Color Scale.

4. The method of claim 1 wherein ethoxylated bisphenol A diacrylate is present.

5. The method of claim 1 wherein ethoxylated hexafluorobisphenol A diacrylate is present.

6. The method of claim 1 wherein propoxylated bisphenol A diacrylate is present.

7. The method of claim 1 wherein said photoinitiator is a free radical photoinitiator selected from the group consisting of benzidimethyl ketal; α,α-dimethyloxy-α-hydroxy acetophenone; 1-hydroxy-cyclohexyl-phenyl ketone; 1-[4-(2-hydroxyethoxy)phenyl]-2-hydroxy-2-methyl-propan-1-one; benzophenone; benzoin; benzoin ethyl ether; benzoin isopropyl ether; α,α-diethyloxy acetophenone; 2-methyl-1-[4-methylthio)phenyl]-2-morpholino-propan-1-one; 2-benzyl-2-dimethylamino-1-(4-morpholinophenyl)-butan-1-one; poly{1-[4-(1-methylvinyl)phenyl]2-methyl-propan-1-one; [4-(4-methylphenylthio)-phenyl] phenylmethanonone; and di-campherquinone.

8. The method of claim 7 wherein said photoinitiator is a free radical photoinitiator selected from the group consisting of benzidimethyl ketal; α,α-diethyloxy acetophenone; α,α-dimethyloxy-α-hydroxy acetopheneone; 1-hydroxy-cyclohexyl-phenyl ketone; 1-[4-(2-hydroxyethoxy)phenyl]-2-hydroxy-2-methyl-propan-1-one; benzophenone; 2-methyl-1-[4-(methylthio)phenyl]-2-morpholino-propan-1-one; and 2-benzyl-2-dimethylamino-1-(4-morpholinophenyl)-butan-1-one .

9. The method of claim 8 wherein said photoinitiator is a free radical photoinitiator selected from the group consisting of benzidimethyl ketal; α,α-dimethyloxy-α-hydroxy acetophenone; 1-hydroxy-cyclohexyl-phenyl ketone; 1-[4-(2-hydroxyethoxy)phenyl]-2-hydroxy-2-methyl-propan-1-one; and benzophenone.

10. The method of claim 1 wherein said photopolymerizable composition further comprises an additional aliphatic ethylenically unsaturated monomer.

11. The method of claim 10 wherein said aliphatic ethylenically unsaturated monomer is selected from the group consisting of aliphatic acrylate monomers and aliphatic methacrylate monomers.

12. The method of claim 11 wherein said aliphatic ethylenically unsaturated monomer is selected from the group consisting of aliphatic diacrylates, aliphatic triacrylates, aliphatic tetraacrylates, aliphatic dimethacrylates, aliphatic trimethacrylates, and aliphatic tetramethacrylates.

13. The method of claim 12 wherein said aliphatic ethylenically unsaturated monomer is selected from the group consisting of aliphatic diacrylates, aliphatic triacrylates, and aliphatic tetraacrylates.

14. The method of claim 1 wherein said composition further comprises a stabilizer.

15. The method of claim 14 wherein said stabilizer is an antioxidant.

16. The method of claim 15 wherein said antioxidant is a substituted phenol selected from the group consisting of 1,3,5-trimethyl-2,4,6-tris(3,5-di-tert-butyl)-4-hydroxybenzyl)benzene; 1,1,3-tris-(2-methyl-4-hydroxy-5-tert-butylphenyl)butane; 4,4'-butylidene-bis-(6-tert-butyl-3-methylphenol); 4,4'-thiobis-(6-tert-butyl-3-methylphenol); tris-(3,5-di-tert-butyl-4-hydroxybenzyl)isocyanurate; cetyl-3,5-di-tert-butyl-4-hydroxybenzene; 3,5-di-tert-butyl-4-hydroxybenzoic acid; 1,3,5-tris-tert-butyl-3-hydroxy-2,6-dimethylbenzyl; stearyl-3-(3,5-di-tert-butyl-4-hydroxyphenyl)propionate; pentaerythritol-tetrabis(3,5-di-tert-butyl-4-hydroxyphenyl); and thiodiethylene-bis-(3,5-di-tert-butyl-4-hydroxy)hydrocinnamate.

17. The method of claim 16 wherein said antioxidant is a substituted phenol selected from the group consisting of stearyl-3-(3,5-di-tert-butyl-4-hydroxyphenyl)propionate; pentaerythritol-tetrabis(3,5-di-tert-butyl-4-hydroxyphenyl); and thiodiethylene-bis-(3,5-di-tert-butyl-4-hydroxy) hydrocinnamate.

* * * * *